United States Patent [19]
James, III

[11] Patent Number: 5,926,815
[45] Date of Patent: Jul. 20, 1999

[54] BINARY SORT ACCESS METHOD AND APPARATUS

[76] Inventor: J. Colin James, III, 1613 Morning Dr., Loveland, Colo. 80538-4410

[21] Appl. No.: 08/988,665

[22] Filed: Dec. 11, 1997

Related U.S. Application Data

[63] Continuation-in-part of application No. 08/507,967, Jul. 27, 1995, abandoned.

[51] Int. Cl.⁶ .................................................. G06F 17/30
[52] U.S. Cl. ............................................ 707/7; 707/5
[58] Field of Search ............................... 707/7, 5

[56] References Cited

U.S. PATENT DOCUMENTS

| | | | |
|---|---|---|---|
| 3,587,057 | 6/1971 | Arnstrong | 340/172.5 |
| 3,611,316 | 10/1971 | Woodrum | 340/172.5 |
| 3,811,115 | 5/1974 | Cordi et al. | 340/172.5 |
| 3,931,612 | 1/1976 | Stevens et al. | 340/172.5 |
| 4,131,947 | 12/1978 | Armstrong | 364/900 |
| 4,939,639 | 7/1990 | Lee et al. | 364/200 |
| 5,060,146 | 10/1991 | Chang et al. | 364/900 |
| 5,121,493 | 6/1992 | Ferguson | 707/7 |
| 5,193,207 | 3/1993 | Vander Vegt et al. | 395/800 |
| 5,204,967 | 4/1993 | Armstrong | 395/800 |
| 5,274,805 | 12/1993 | Ferguson et al. | 707/7 |
| 5,307,485 | 4/1994 | Bordonaro et al. | 707/7 |
| 5,359,729 | 10/1994 | Yarnell et al. | 707/7 |
| 5,454,071 | 9/1995 | Siverbrook et al. | 395/141 |
| 5,557,791 | 9/1996 | Cheng et al. | 707/7 |

OTHER PUBLICATIONS

Martin, Computer Databse Organization 2nd edition, Text Book, pp. 351–374, 1975.

*Primary Examiner*—Thomas G. Black
*Assistant Examiner*—Frantz Coby
*Attorney, Agent, or Firm*—Ancel W. Lewis, Jr.

[57] ABSTRACT

The binary sort access method and apparatus makes use of a binary search to show where an item of data not found should be placed in sorted order within a list in a table in memory or in a file on a storage device. The method includes building the list structure when items of data are inserted in and maintained in sorted order in a table in memory or in a file on a storage device. When no blank table entry is available items of data are moved to make room for the next succeeding item of data. A partially filled or filled list of items may be rewritten again to provide one or more blank table entries between each item of data.

8 Claims, 4 Drawing Sheets

| |
|---|
| 1 |
| B |
| 11 |
| B |
| 21 |
| 25 |
| BLANK |
| 31 |
| 41 |
| 43 |
| 51 |
| B |
| 61 |

BINARY SORT ACCESS METHOD AND APPARATUS

This is a continuation-in-part of application Ser. No. 507,967 filed Jul. 27, 1995 now abandoned.

TECHNICAL FIELD

The present invention relates to a method of and apparatus for accessing items of data in a sorted list.

BACKGROUND ART

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

In a binary search, the conventional method used is to determine the midpoint of a sorted list of items of data or a subset of a list by calculating the sum of the extreme pointers and then dividing by two. In a conventional binary search half of the remaining list is eliminated from the search by each comparison. When the searched item is not found, the pointers cross to indicate where that searched item would be inserted to be in sorted order. Given N items in a list, N/2 items on average must be physically moved to make room for a new item to be inserted in sorted order.

DISCLOSURE OF THE INVENTION

In accordance with the present invention there is the binary sort access method and apparatus wherein one or more blank table entries are interspersed between each item of data in a sorted list in a table in memory or in a file on a storage device, and a new item of data is added by insertion in the blank table entries to build the list. If a blank table entry is not available at the position desired, then the old items of data are searched until a blank entry is found, into which the next old item of data is moved respectively and consecutively until a blank table entry is available for the new item of data. The list is rewritten with one or more blank table entries interspersed between each item of data after a selected number of new insertions.

BRIEF DESCRIPTION OF THE DRAWINGS

Details of this invention are described in connection with the accompanying drawings in which like parts bear similar reference numerals in which.

DETAILED DESCRIPTION OF THE INVENTION

Figures 1, 2, 3, 4, 5:
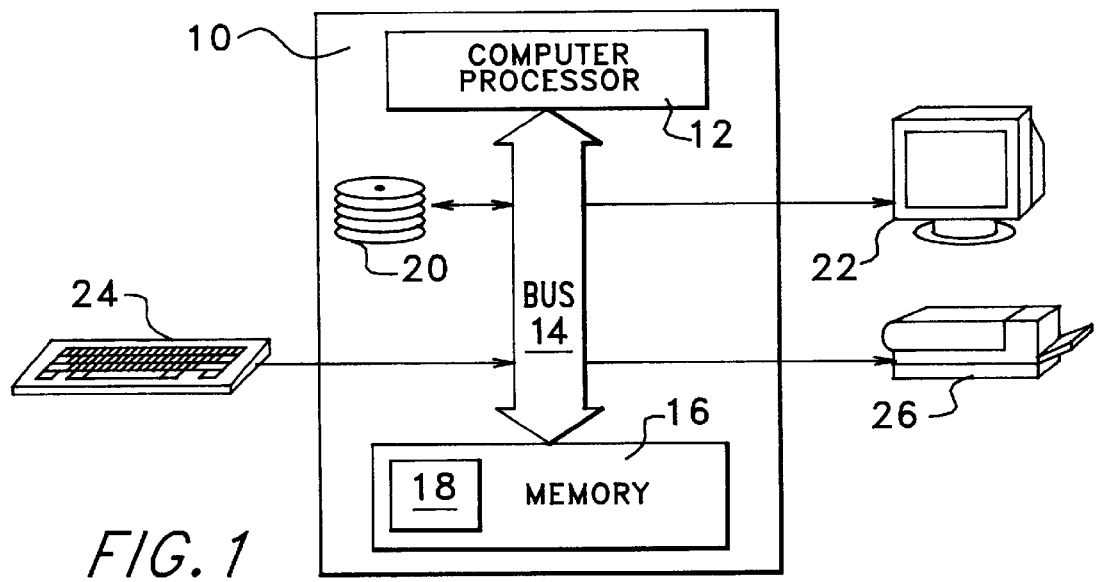
FIG. 1 is a block diagram showing parts of a general purpose computer and associated apparatus by which the method of the present invention is carried out.
FIG. 2 is a table representing a series of entries of data with a blank table entry between each item of data in a sorted list in the table in memory or in a file on a storage device.
FIG. 3 is a table of entries of data in which two additional items of data have been added to the sorted list in the table in memory or in a file on a storage device.
FIG. 4 is a table representing a series of entries of data in which one entry of data has been moved and replaced by a blank table entry.
FIG. 5 is a table of entries of data in which an additional item of data has been added to the sorted list.

Referring now to FIG. 1, a general purpose computer 10 is shown having computer processor 12, a system bus 14, and a memory 16. The memory contains index tables 18 used in carrying out the binary sort access method according to the present invention. Auxiliary devices shown coupled to the bus 14 are a disc drive 20, monitor 22, keyboard 24 and printer 26.

The first step of the present invention involves physically placing or putting items of data in sorted order with one or more blank table entries interspersed between each item of data. This is represented in FIG. 2 wherein there is shown a table representing entries with items of data in a sorted list in locations in memory or in a file on a storage device identified by numerals 1, 21, 31, 41, 51, and 61 with a blank table entry "B" interspersed between each item of data. It is understood there may be a plurality of blank table entries instead of a single blank table entry between items of data.

The second step involves building the list of items by adding items of data in order in the space occupied by the blank table entries in memory or in a file on a storage device. A binary search is performed to locate the desired location for insertion of each new item of data. If the desired location is a blank table entry, the new item of data is inserted. This step is represented in FIG. 3 wherein there is shown the table of entries to which an item of data identified as numeral 25 has been added in order in the blank table entry B between items 21 and 31, and item of data represented by numeral 43 has been added in order in the blank table entry between items 41 and 51.

The third step involves attempting to insert a new item of data in order in the list and finding no space available. The fact there is no space available is detected by keeping a count of the items of data. When no space is available at the desired insertion location, the blank table entry nearest the desired insertion location is identified, the items of data between the nearest blank table entry and the desired insertion location are moved to make room for the new item of data, and the new item of data is inserted at the desired location.

In FIG. 4 there is shown the table of entries in which a blank table entry is added between item of data 25 and item of data 31, and item of data 31 is moved below to the next blank table entry so that item 27 subsequently may be inserted in the table, as is shown in the table in FIG. 5. At any time after the first item of data is added or when the table is filled, the table is rewritten to intersperse at least one blank table entry between each item of data as is shown in FIG. 2.

Figure 6:
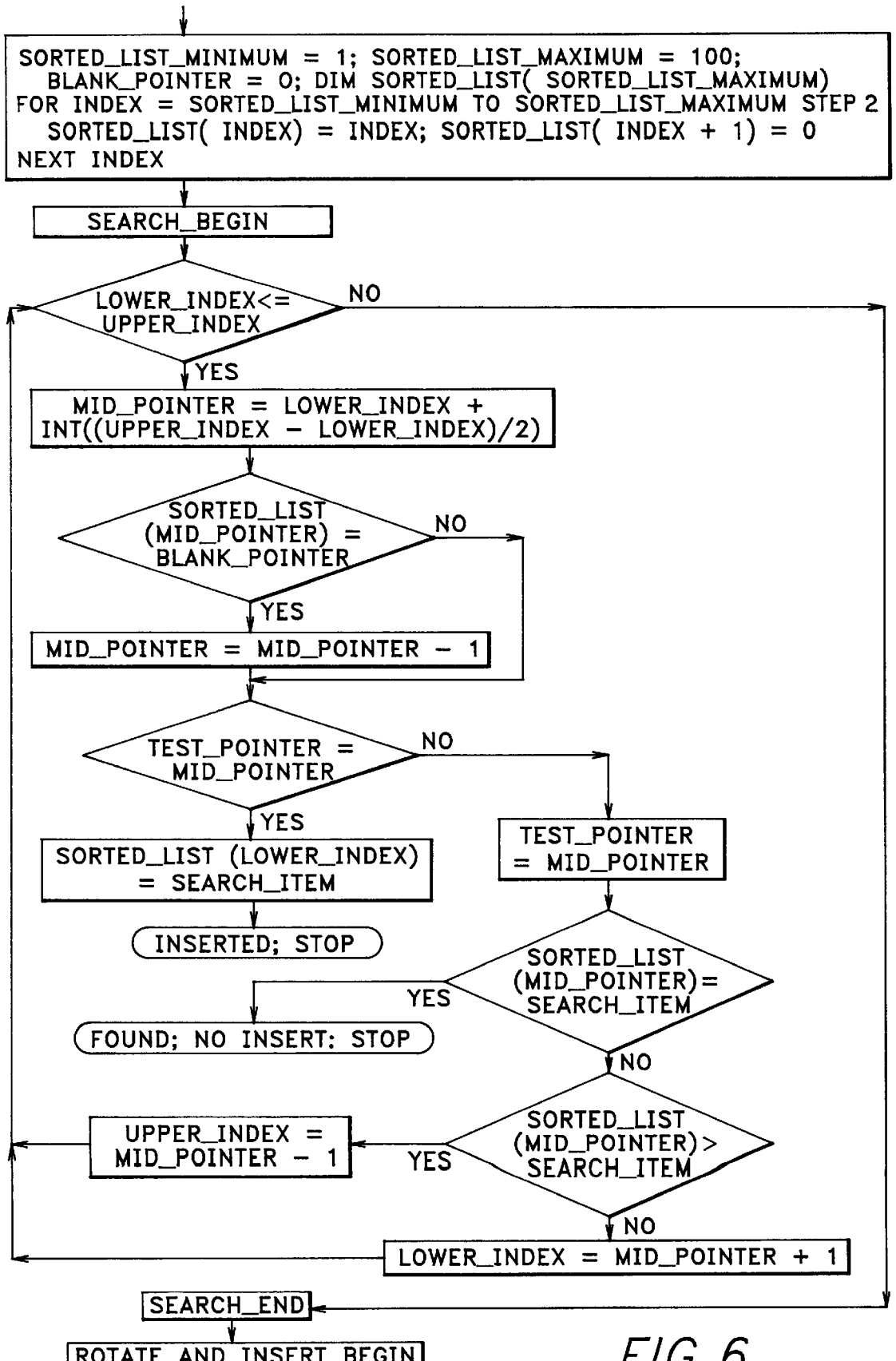
FIG. 6 is the first portion of the program flow chart for carrying out the binary sort access method according to the present invention.
Figure 7:
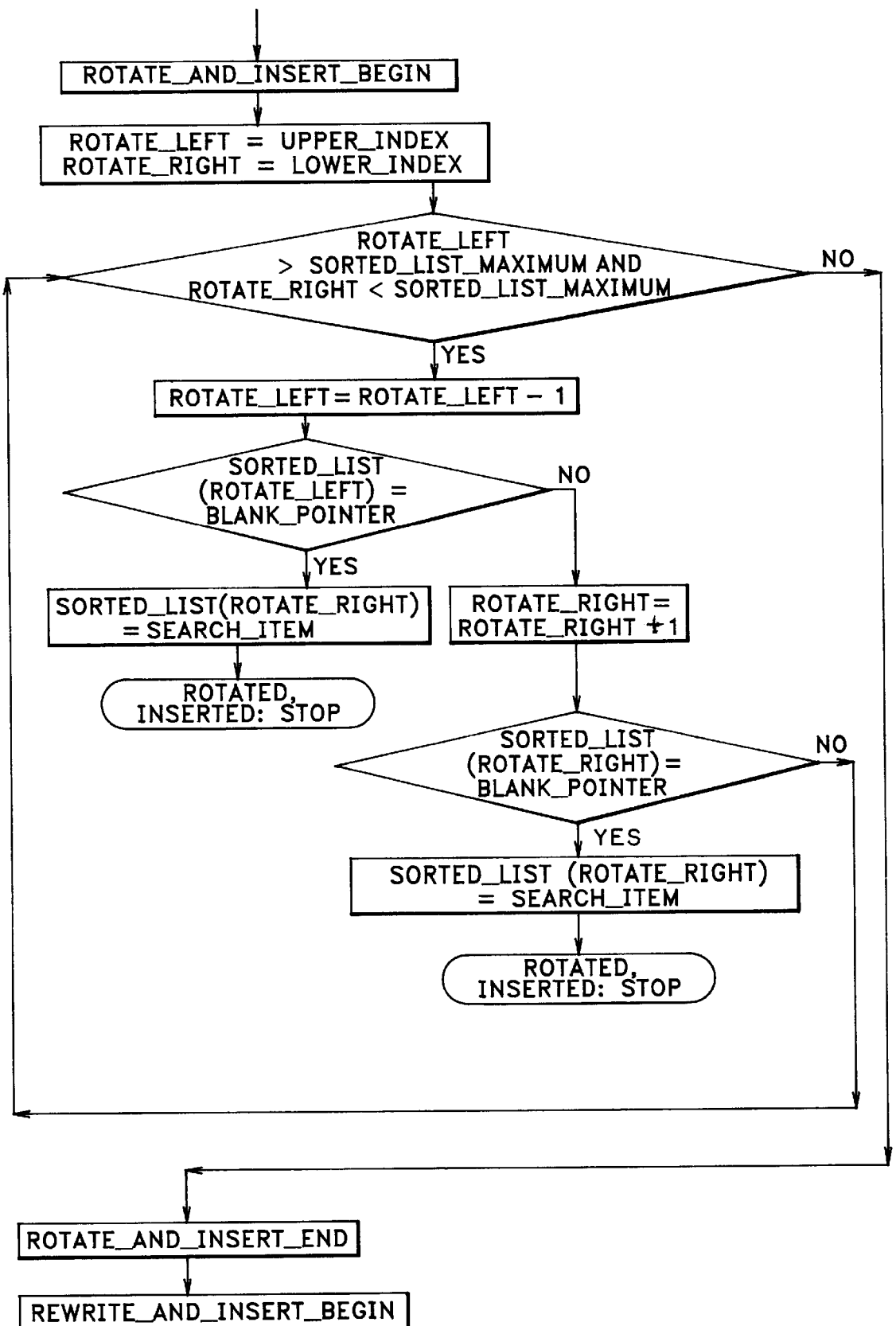
FIG. 7 is another portion of the program flow chart.
Figure 8:
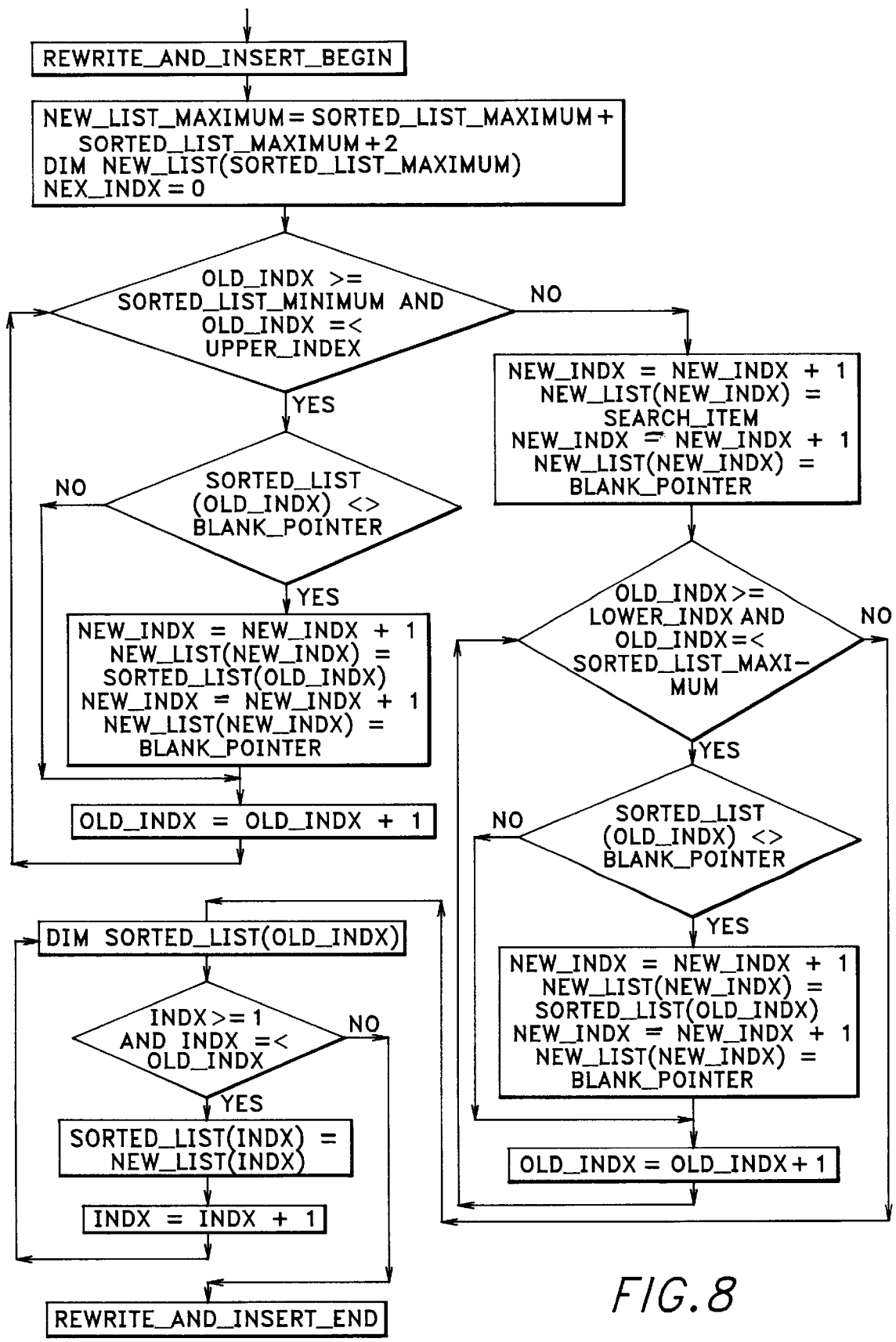
FIG. 8 is another portion of the program flow chart.

Referring now to FIGS. 6, 7 and 8 there is shown the flow chart for the program for carrying out the method. This chart shows that according to the present invention a list of items of data are placed in a sorted order in a table in memory or in a file on a storage device, and at least one and possibly more than one blank entry is interspersed between each item of data in memory 16 or in a file on a storage device such as disc drive 20. Items of data may be successively added in order in the space occupied by the blank table entries. When there is no blank table entry available in the list of items, the items of data are moved to form a blank table entry to make room for the next item of data. At any time after the first item is added until the blank entries become filled, the list of items may be rewritten providing one or more blank table entries between each item of data. This method shows that the step of moving the items of data to form the blank table entry includes the substep of finding the nearest blank table entry to a desired insertion location and moving all table entries between the nearest blank table entry and the desired insertion location to form the blank table entry resulting in opening up the blank table entry. As required, the method and apparatus of the present invention are able to rewrite all or part of the list structures. This is very rapid because while sequentially reading a sorted list once, the method and apparatus of the present invention also writes the same list with blank table entries inserted as necessary into memory or into a file on a storage device.

In the preferred embodiment of the present invention, the method includes the steps of counting the number of insertions made between pairs of successive initial items of data and rewriting the list when all blank entries between any pair of-successive initial items of data are filled. The method is optimized with initially placing items of data in the list with eleven blank entries between each pair of items of data, and rewriting the list as soon as eleven insertions are made between any pair of successive initial items of data.

In an alternative embodiment of the present invention, the method includes the steps of counting the number of insertions made after the list is initially written and rewriting the list after a selected number of insertions. For example, the method may count the insertions and rewrite the table when the number of insertions equals the number of remaining blank entries.

The method and apparatus of the present invention reduces the average number of items that must be physically moved to make room for a new item to be inserted in sorted order from the prior art average of N/2 to an average of less than one. The method and apparatus of the present invention is ideally suited as an index searching and sorting method for large, real-time applications such as those encountered in databases accessed by Structured Query language (SQL) which typically do not perform well with indexing schemes using structures known in the art as binary trees or B-trees. The present invention is a special case of such binary trees: it is a binary tree of a single depth or unitary level which is rewritten with blank node entries when the tree becomes full.

The program code lists are set forth in the attached Appendices consisting of six pages.

Although the present invention has been described with a certain degree of particularity, it is understood that the present disclosure has been made by way of example and that changes in details of structure may be made without departing from the spirit thereof.

APPENDIX A

```
rem Source code for BSAM in TrueBASIC ™
rem Copyright © 1992–1995., Colin James III
rem All Rights Reserved
begin bsam_routine
    rem set_up_begin
        let sorted_list_minimum = 1
        let sorted_list_maximum = 100
        let blank_pointer = 0
        dim sorted_list( 100)
        for index = sorted_list_minimum to
        sorted_list_maximum
            step 2
            let sorted_list( index) = index
            let sorted_list ( index + 1 ) = 0
        next index
    rem set_up_end
    rem_search_begin
        set cursor 1,1
        input item_searched
        let search_item = item_searched
        let lower_index = sorted_list_minimum
        let upper_index = sorted_list_maximum
        let test_pointer = 0
```

APPENDIX A-continued

```
        let item$ = "To Insert"
        do while lower_index <= upper_index
            let mid_pointer = lower_index + int(( upper_index
                - lower_index)/2)
            if sorted_list( mid_pointer) = blank_pointer then
                let_mid_pointer = mid_pointer - 1
            end if
            if test_pointer = mid_pointer then
                let sorted_list( lower_index ) =
                search_item
                let item$ = "Inserted Ok"
                stop
            end if
            let test_pointer = mid_pointer
            if sorted_list( mid_pointer) = search_item then
                let item$ = "Found ok - - No Insert"
                stop
            elseif sorted_list( mid_pointer) = search_item then
                let upper_index = mid_pointer - 1
            elseif sorted_list{ mid_pointer) < search item then
                let lower_index = mid_pointer + 1
            end if
        loop
    rem search_end
    rem rotate_and_insert_begin
        let rotate_left = upper_index
        let rotate_rght = lower_index
        while rotate_left > sorted_list_minimum and
            rotate_rght < sorted_list_maximum
            let rotate_left = rotate_left - 1
            if sorted_list( rotate_left) = blank_pointer then
                let sorted_list( rotate_left) = search_item
                let item$ = "Rotated and Inserted OK"
                stop
            end if
            let rotate_rght = rotate_rght + 1
            if sorted_list ( rotate_rght) = blank_pointer then
                let sorted_list( rotate_rght) = search_item
                let item$ = "Rotated_and Inserted OK"
                stop.
            end if
        loop
    rem rotate_and_insert_end
    rem rewrite_and_insert_begin
        let_new_list_maximum
            = sorted_list_maximum + sorted_list_
            maximum + 2
        dim new_list( sorted_list_maximum)
        let new_indx = 0
        for old_indx = sorted_list_minimum to upper_index
            if sorted_list( old_indx) <> blank_pointer then
                let new_indx = new_indx + 1
                let new_list( new_indx)
                    = sorted_list( oid_indx)
                let new_indx = new_indx + 1
                let new_list( new_indx) = blank_pointer
            end if
        next old_indx
        let new_indx = new indx + 1
        let new_list( new_indx) = search_item
        let new_indx = new_indx + 1
        let new_list( new_indx) = blank_pointer
        for old_indx = lower_index to sorted_list_maximum
            if sorted_list( old_indx) <>blank_pointer then
                let new_indx = new_indx + 1
                let new_list( new_indx)
                    = sorted_list( old_indx)
                let new_indx = new_indx + 1
                let new_list( new_indx) = blank_pointer
            end if
        next old_indx
        dim sorted_list( old_indx)
        for indx = 1 to old_indx
            let sorted_list( indx) = new_list( indx)
        next indx
    rem rewrite_and_insert_end
end bsam_routine
```

APPENDIX B

```
rem Source code for BSAM in TrueBASIC ™
rem copyright © 1997, Colin James III
rem All Rights Reserved
rem set up sort parameters
library "execlib.trc"
let n_lim_idx = 200000
let increment_step = 5000
let num_child = 11   rem number of empty nodes
let n_lim = 1 + n_lim_idx    rem number of random keys to be tested
let n_lim_minus_1 = n_lim - 1
rem set up random permutation array of input values
dim r1( 1: 1)
dim keys$( 0)
mat redim r1( 1: n_lim_idx)
for i = 1 to n_lim_minus_1
    let r1_( i) = i
next i
for i = n_lim_minus_1 to 2 step -1
    let idx = INT( RND * i) + 1
    let t = r1( i)
    let r1( i) = r1( idx)
    let r1( idx) = t
next i
rem set up sort file paramaters
let rec_size = 8            rem 8-byte IEEE number format
let file_A$ = "A.dat"
let file_B$ = "B.dat"
let file_C$ = "_d.dat"
let zero$    = NUM$( 1)     rem filler value is 1
let minus_one$ = NUM$( 0)   rem sentinel value is 0
let z = 0
let N1 = 1
let left = 1
let right = N1
open #1: name file_A$, org byte, create newold, access outin,
         recsize rec_size
for  j = to num_child       rem first record is 0 1 1 1 1 1 1 1 1 1 1 1
set  #1: record j * rec_size + 1
    if j = 0 then
        write #1: minus_one$
    else
        write #1: zero$
    end if
next j
close    #1
let num_items = n1
let ix = 0
rem main loop until ix = n_lim_minus 1
do
    let ix = ix + 1
    let v$ = num$( r1( ix))
rem open files
open #1: name file_A$, org byte, create newold, access outin,
         recsize rec_size
open #2: name file_B$, org byte, create newold, access outin,
         recsize rec_size
let left = 1
let right = N1
let i = 0
let j = 0
rem binary_search loop
do
    let i = IP( ( left + right) / 2)
    set  #1: record ( ( ( i - 1) * rec_size *
         ( num_child + 1)) + ( 1))
    read #1: rec$
    if v$ < rec$ then
        let right = i - 1
    else
        let left = i + 1
    end if
loop until v$ = rec$ or left > right
rem test search results loop
do
    rem test if recS found at ( i, 0)
    if v$ = rec$ then
        exit do
    end if
    let bit_limit = 0
    rem insert rec$ at first node ( right, 1 ... num child) = 0
    for   j = 1 to num_child
        set   #1: record ( ( right - 1) * rec_size *
              ( num_child + 1)) + ( ( j * rec_size) + 1)
        read #1: rec$
        if rec$ = zero$ then
            set #1: record ( ( right - 1) * rec_size *
                ( num_child + 1)) + ( ( j * rec_size) + 1)
            write #1: v$
            let num_items = num_items + 1
            let bit_limit = j
            exit for
        end if
    next j
    if bit_limit = 1 then
        rem only one key in nodes of the record, so the node
        rem is already sorted
        exit do
    else
        rem more than one key, so sort the nodes
        rem ( i, 1 ... num_child)
        if bit_limit <= num_child then
            rem insertion sort of nodes using a
            rem sentinel record
            for   i = 2 to bit_limit
                set #1: record ( ( right -1) * rec_size
                    * ( num_child +1)) + ( ( i * rec_
                    size) + 1)
                read #1: t_rec$
                let j = i
                do
                    set    #1: record ( ( right - 1) *
                           rec_size * ( num_child + 1)) +
                           ( ( ( j - 1) * rec_size) + 1)
                    read #1: rec$
                    if rec$ > t_rec$ then
                        set   #1: record ( ( right -
                              1) * rec_size * ( num_
                              child +1)) + ( ( j * rec_
                              size) + 1)
                        write #1: rec$
                        let j = j - 1
                    else
                        exit do
                    end if
                loop
                set #1: record ( ( right - 1) *
                    rec_size * ( num_child + 1)) +
                    ( ( j
                    * rec_size) + 1)
                write #1: t_rec$
            next i
        end if
        if bit_limit <> num_child then
            exit do
        else
            rem empty nodes filled in this record, so
            rem rewrite sorted file with empty nodes
            rem in all records
            let n2 = num_items
            let counter = 0
            for  i = 1 to num_items
                for   j = 0 to num_child
                    set #2: record ( ( i - 1) *
                        rec_size * ( num_child + 1)) +
                        ( ( j * rec_size) + 1)
                    write #2: zero$
                next j
            next i
            for i = 1 to n1
                for   j = 0 to num_child
                    set  #1: record ( ( i - 1) *
                         rec_size * ( num_child +
                         1)) +( ( j * rec_size) + 1)
                    read #1: rec$
                    if rec$ = zero$ THEN
                        exit for
                    else
                        let counter = counter + 1
```

APPENDIX B-continued

```
                        set   #2: record
                        ( ( counter
                          − 1) * rec_size *
                          ( num_child
                          + 1)) + 1
                          write #2: rec$
                    end if
                next   j
            next   i
            let n1 = n2
            let num_items = n1
                rem close files
                close   #1
                close   #2
                rem rename files
                call Exec_Rename( file_A$, file_C$)
                call Exec_Rename( file_B$, file_A$)
                unsave file_C$
                exit do
            end if
        end if
    loop
    rem close_files
    close   #1
    close   #2
loop until ix = n_lim_minus_1
end
```

What is claimed is:

1. A binary sort access method comprising the steps of:

placing a plurality of first items of data in a sorted order in a list in a memory means with at least one blank entry between each pair of successive first items of data, building said list by adding items of data in order into said blank entries, counting said items of data added to said list, rewriting said list with at least one blank entry between each pair of successive items when a selected number of items of data have been counted, performing a binary search to identify an insertion location in said list at which to add an item of data, detecting when no blank entry is available at said insertion location, finding said blank entry nearest said insertion location, and moving all items of data between said blank entry and said insertion location to form a blank entry at said insertion location.

2. The method as set forth in claim 1 wherein the step of counting includes counting said items of data added between each pair of successive first items of data and detecting when items of data have been added into all blank entries between any pair of successive first items of data.

3. The method as set forth in claim 2 wherein the step of rewriting is performed when items of data have been added into all blank entries between any pair of successive first items of data.

4. A binary sort access method comprising the steps of:

placing a plurality of first items of data in a sorted order in a list in a memory means with at least one blank entry between each pair of successive first items of data, performing a binary search to identify a location in the list at which to add a new item of data in order, adding the new item of data in order at the location when a blank entry is available at the location, detecting when no blank entry is available at the location, finding the blank entry nearest the location, moving all items of data between the blank entry and the location to form a blank entry at the location, and adding the new item of data, building the list by successively adding new items of data in order, counting the new items of data added between each pair of successive first items of data, and rewriting the list with at least one blank entry between each pair of successive items of data when new items of data have been added into all blank entries between any pair of successive first items of data.

5. A binary sort access method comprising the steps of:

placing a plurality of first items of data in a sorted order in a list in a memory means with at least one blank entry between each pair of successive first items of data, performing a binary search to identify a location in the list at which to add a new item of data in order, adding the new item of data in order at the location when a blank entry is available at the location, detecting when no blank entry is available at the location, finding the blank entry nearest the location, moving all items of data between the blank entry and the location to form a blank entry at the location, and adding the new item of data, building the list by successively adding new items of data in order, counting the new items of data added to the list, and rewriting the list with at least one blank entry between each pair of successive items of data when a selected number of new items of data have been added.

6. An apparatus for performing a binary sort access method comprising:

means for placing a plurality of first items of data in a sorted order in a list with at least one blank entry between each pair of successive first items of data, means for building the list by adding items of data in order into the blank entries, means for counting the items of data added to the list, and means for rewriting the list with at least one blank entry between each pair of successive items when a selected number of items of data have been counted.

7. The apparatus as set forth in claim 6 including:

means for identifying an insertion location in the list at which to add an item of data, means for detecting when no blank entry is available at the insertion location, means for finding the blank entry nearest the insertion location, means for moving all items of data between the blank entry and the insertion location to form a blank entry at the insertion location.

8. The apparatus as set forth in claim 7 wherein said means for counting counts the items of data added between each pair of successive first items of data, and said means for rewriting rewrites said list when new items of data have been added into all blank entries between any pair of successive first items of data.

* * * * *